United States Patent [19]

Domine

[11] Patent Number: 5,499,782
[45] Date of Patent: Mar. 19, 1996

[54] LIGHTNING SHIELD

[75] Inventor: Christophe A. Domine, Bristol, United Kingdom

[73] Assignee: British Aerospace Public Limited Company, London, England

[21] Appl. No.: 95,376

[22] Filed: Jul. 23, 1993

[30] Foreign Application Priority Data

Jul. 24, 1992 [GB] United Kingdom ............... 9215827

[51] Int. Cl.$^6$ .................................................. B64D 45/02
[52] U.S. Cl. ........................................... 244/1 A; 361/218
[58] Field of Search .................................. 244/1 A, 123, 244/131, 132, 117 R, 119; 361/215–218; 29/525.1; 403/408.1, 18

[56] References Cited

U.S. PATENT DOCUMENTS

| | | |
|---|---|---|
| 3,755,713 | 8/1973 | Paszkowski . |
| 3,989,984 | 11/1976 | Amason et al. ............... 244/1 A |
| 4,502,092 | 2/1985 | Bannik et al. ............... 244/1 A |
| 4,557,560 | 12/1985 | Bohannon, Jr. et al. . |
| 4,813,631 | 3/1989 | Gratzer ........................ 244/1 A |
| 4,979,281 | 12/1990 | Smith et al. ................. 244/1 A |

FOREIGN PATENT DOCUMENTS

| | | |
|---|---|---|
| 248122 | 12/1987 | European Pat. Off. . |
| 318839 | 6/1989 | European Pat. Off. . |
| 484203 | 5/1992 | European Pat. Off. ........... 244/1 A |
| 2582987 | 12/1986 | France . |
| 3608938 | 9/1987 | Germany . |

*Primary Examiner*—Galen L. Barefoot
*Attorney, Agent, or Firm*—Cushman, Darby & Cushman

[57] ABSTRACT

A lightning shield comprising a fiber reinforced plastics laminate (13, 14), a fixed leading edge structure (12) and an aircraft wing (1) comprising said laminate shield are provided. The laminate shield comprises a series of laminae (21, 22) of fibre reinforcing material held together by plastics matrix material, the laminate including a layer of electrically conductive material (19) interposed between an outer lamina (21) and its next adjacent lamina (22) for conducting lightning current attaching to the laminate to conducting fasteners (31, 32) passing through the laminate (13, 14).

6 Claims, 2 Drawing Sheets

LIGHTNING SHIELD

BACKGROUND TO THE INVENTION

This invention relates to lightning shields and in particular to a fibre reinforced plastics laminate comprising such a shield and to an aircraft aerodynamic surface comprising such a laminate.

DESCRIPTION OF THE PRIOR ART

It is known to provide protection from lightning strike for fuel, electrical equipment and cable raceways housed within a fixed leading edge structure of an aircraft wing having non conductive skin panels, for example of fibre reinforced plastics material, by attaching a layer of metallic mesh material, for example stretched aluminium mesh to an outer surface of the skin panel to act as a shield. Such mesh will conduct a lightning attachment along the surface of the skin panel to a current dissipation path within the aircraft, usually via skin attachment fasteners which are of conducting material.

A disadvantage of such an arrangement for use on aerodynamic surfaces is that in order to obtain adequate electrical contact with the mesh through the fasteners, it is necessary to use large diameter washers on the panel surface to give a sufficient area of contact. Such washers upset the aerodynamic flow over the panel surface and the process of fitting the washers requires time consuming and skilled labour to strip plastics material to expose the mesh for satisfactory electrical contact to be achieved.

It is an object of the invention to provide lightning protection for non conducting laminates of the type described which overcomes the disadvantages of the prior art.

SUMMARY OF THE INVENTION

According to one aspect of the invention there is provided a lightning shield comprising a fibre reinforced plastics laminate having a series of laminae of fibre reinforcing material held together by plastics matrix material, wherein a layer of electrically conductive material is interposed between an outer lamina and its next adjacent lamina.

Lightning protection for equipment housed by the laminate is thus provided which reduces the possibility of delamination of laminae beneath the layer of electrically conductive material taking place.

According to a second aspect of the invention there is provided a fixed leading edge structure for an aircraft wing, said structure being attachable to a front spar of the wing and including a sub-spar supporting a D-nose aerodynamic profile skin panel forwardly thereof and an upper and a lower leading edge skin panel rearwardly thereof, at least one of said skin panels comprising a lightning shield according to the first aspect of the invention.

Electrical equipment and wiring housed by the structure will thus be protected from lightning strike by the laminate or laminates according to the invention.

The or each shield may be electrically bonded to the structure by a series of fasteners of conducting material passing through countersunk holes in the laminate, each countersink exposing an edge region of said layer of electrically conductive material for contact with a fastener. Electrical bonding is thus achieved without disturbing the airflow. An included countersink angle of substantially 100 degrees has been found advantageous.

The layer of electrically conductive material may comprise a metallic mesh which may be of aluminium and may have a density of substantially 78 grammes per square meter of mesh.

According to a third aspect of the invention there is provided an aircraft wing including a wing structural box, a trailing edge structure located rearwardly of the wing structural box and a fixed leading edge structure according to the second aspect of the invention located forward of the wing structural box.

BRIEF DESCRIPTION OF THE DRAWINGS

The invention will now be described by way of example with reference to the accompanying drawings of which.

DESCRIPTION OF PREFERRED EMBODIMENT

Figure 1:
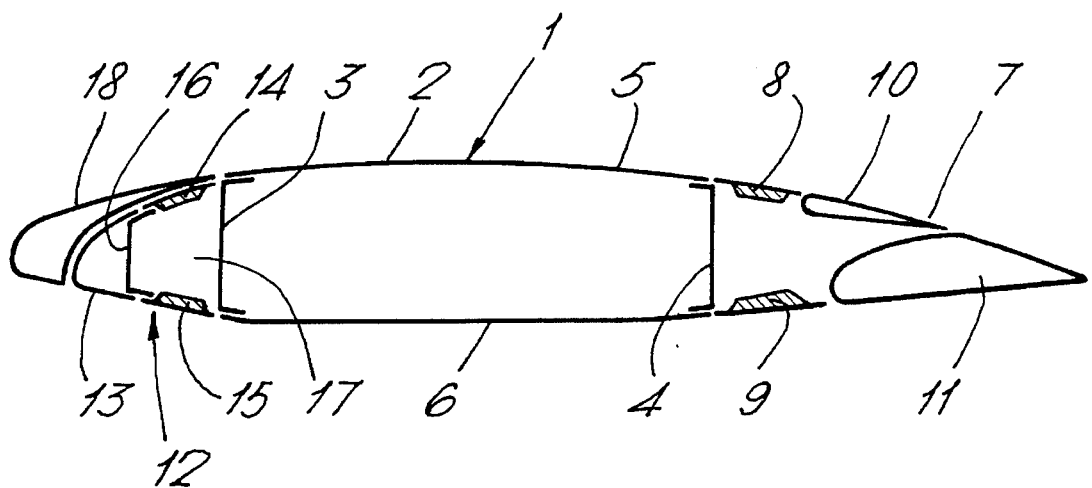
FIG. 1 is a schematic sectional view taken through a wing according to the invention.

Referring to the drawings, a wing 1 comprises a wing structural box 2 having a front spar 3, a rear spar 4 and upper and lower aerodynamic profile defining skins 5,6.

The wing box 2 supports rearwardly of the rear spar 4 a trailing edge structure 7 comprising upper and lower trailing edge panels 8, 9, a spoiler 10 and a flap 11.

The front spar 3 supports forwardly thereof a fixed leading edge structure 12 comprising a D-nose aerodynamic profile skin panel 13, upper and lower leading edge panels 14, 15 and a sub-spar 16. The sub-spar 16 is attached to the front spar 3 by the upper and lower leading edge panels 14, 15 and by a series of spanwise spaced ribs 17.

The wing 1 carries a leading edge high lift device in the form of a slat 18.

Figure 2:
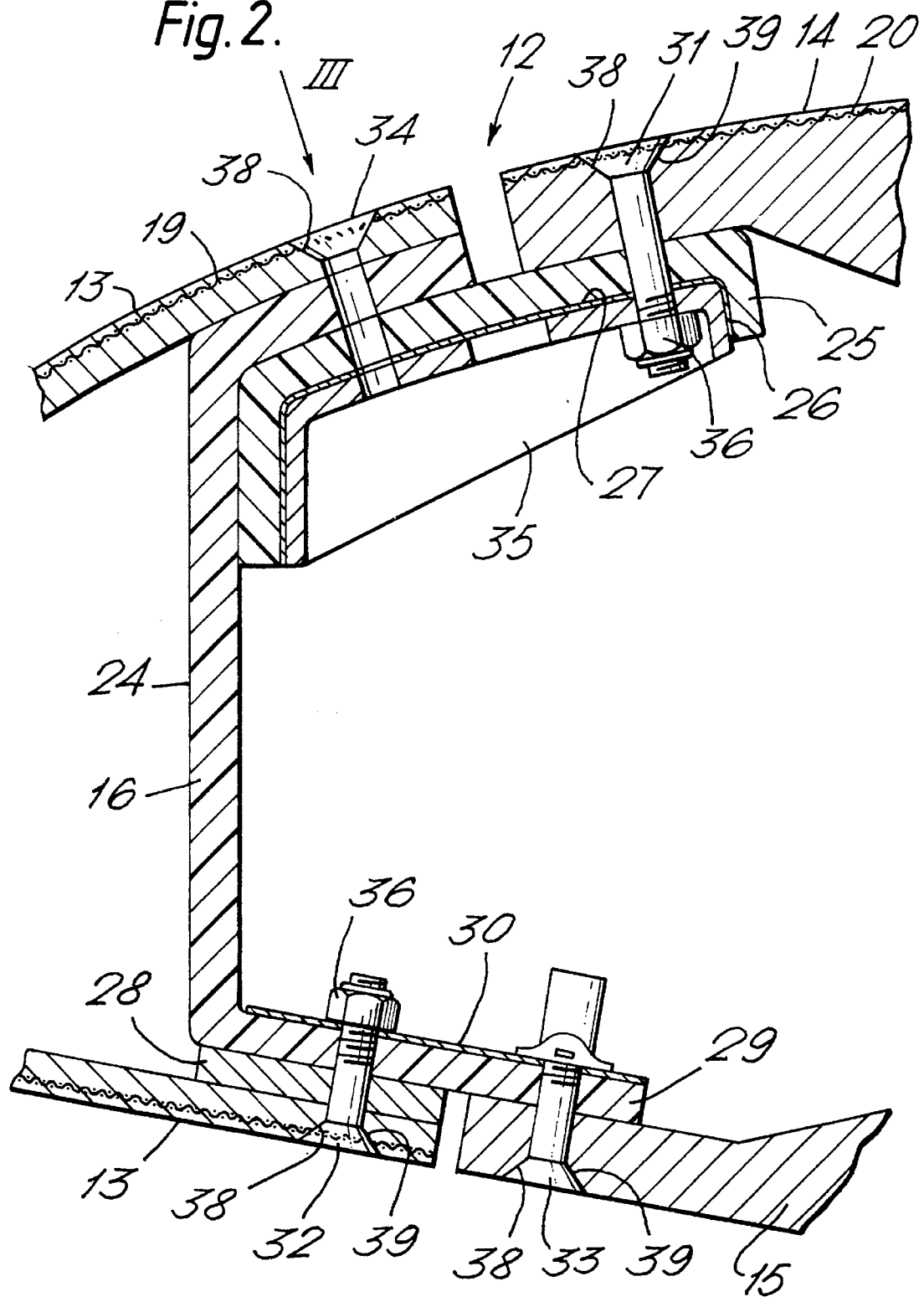
FIG. 2 is a detail section through a fixed leading edge structure according to the invention.

Referring to FIG. 2, a fixed leading edge structure 12 is shown in vertical section looking spanwise. The structure comprises 3 skin panels, namely a D-nose aerodynamic profile panel 13, an upper leading edge panel 14 and a lower leading edge panel 15. All three panels are made of fibre reinforced composite with the D-nose panel 13 and the upper leading edge panel 14 comprising a layer of aluminium mesh 19, 20 respectively located in each case between an outer or surface lamina 21 and its next adjacent lamina 22 (see FIG. 3).

The panels 13, 14, 15 are all mounted to a sub-spar 16 running spanwise of the wing 1. The sub-spar 16 has a main portion 24 of fibre reinforced plastics and an upper boom 25 again of fibre reinforced plastics having a layer of conducting foil 26 laid on an inner surface 27 thereof. A spacer 28 is interposed between a lower boom 29 of the sub-spar 16 and the D-nose panel 13. The main portion 24 of the sub-spar 16 also has a layer of conducting foil 30 along the lower boom 29 thereof.

The panels 13, 14, 15 and the sub-spar 16 are held together by fasteners in the form of bolts 31, 32, 33. A bolt hole 34 (shown in FIG. 3) receives a further bolt (not shown) to fasten the D-nose panel 13 to the sub-spar 16 and to a metal bracket 35 which is one of many spaced at intervals along the wing span.

A conducting path for lightning striking the D-nose panel 13 or the upper leading edge panel 14 is provided through the layers of mesh 19, 20 into retaining bolts 31 and thence via nuts 36 into each metal bracket 35 and then along the foil layer 26 to a safe conducting path for lightning current within the aircraft.

Tests have shown that lightning attachment to the fibre reinforced panels 13, 14 is unlikely to occur except at the points of fastening to the sub-spar 16 via the bolts. Nevertheless such lightning protection for fibre reinforced panels may be required to protect equipment housed thereby and when a lightning attachment was achieved to such a fibre reinforced panel in tests by making a deep score in the upper lamina 21 of the panel to expose the metal of the mesh, satisfactory conduction of current into a safe dispersal path throughout the aircraft structure was obtained. The simulated lightning attachment of the test only produced local delamination of the laminae 21,22 between which the mesh was sandwiched and produced no penetration of the panel. In practice the outer lamina presents an insulating layer to prevent lightning attachment which, in combination with the proximity of the composite panels to metal components, when on aircraft wings, makes attachment to the composite panels unlikely, however the lightning protection afforded by the arrangement according to the invention was found to be perfectly adequate.

One of the reasons for locating the layer of mesh 19, 20 one layer down from the surface is to enable an optimum area of contact between the mesh and a conducting bolt or fastener securing the panel in place.

Figure 3:
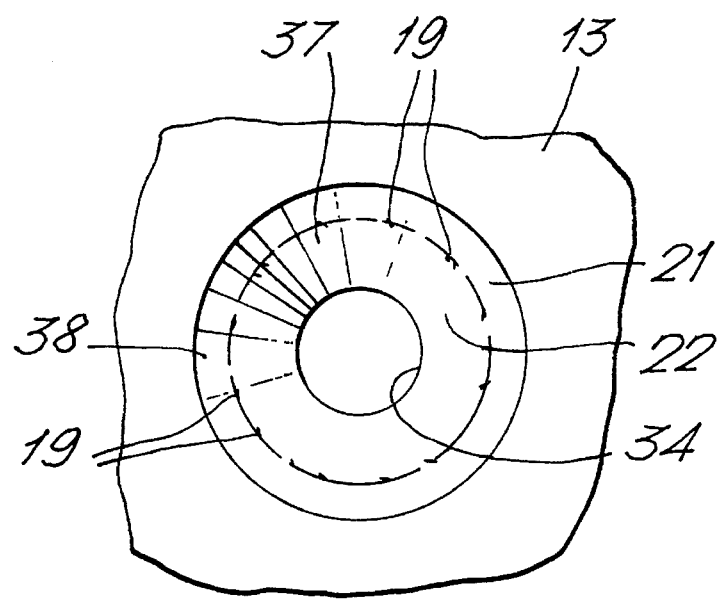
FIG. 3 is a view taken in the direction III on FIG. 2, enlarged for clarity.

Referring to FIG. 3, it can be seen that the larger the diameter of contact area 37 employed the greater will be the number of strands of the mesh 19 which contact the fastener. FIG. 2 shows each panel 13, 14, 15 as having a countersink 38 to receive an angled bolt head 39. Tightening the nut 36 will draw the bolt head 39 against the countersunk area 38 of the aperture 34 and create a firm electrical contact between the bolt 31 and the strands of the mesh 19. The action of countersinking the aperture 34 with a countersink tool (not shown) will tend to draw strands of the mesh 19 from between the laminae 21, 22 across the surface of the countersink 38, as shown in FIG. 3. This will increase the available contact area between the bolt 31 and each strand of the mesh 19.

Placing of the layer of mesh according to the invention thus discourages attachment of lightning to the panel and, in combination with countersinking the apertures for fasteners, affords electrical contact between the mesh and the fastener whilst avoiding the use of airflow destroying projections on the aerodynamic surfaces.

I claim:

1. A lightning shield comprising a fiber reinforced plastics laminate having a series of laminae of fiber reinforcing material held together by plastics matrix material, wherein a layer of electrically conductive material is interposed between an outer lamina and its next adjacent lamina, said lightening shield defining at least one countersunk hole therethrough, the at least one hole being partly defined by a countersink which exposes an edge region of the layer of electrically conductive material for contact with a fastener sized to pass therethrough.

2. A lightning shield as in claim 1, in which the included countersink angle is substantially 100 degrees.

3. A lightning shield as in claim 1 in which the layer of electrically conductive material comprises a metallic mesh.

4. A lightning shield as in claim 3 in which said mesh is of aluminium having a density of substantially 78 grammes per square meter.

5. A fixed leading edge structure for an aircraft wing, said structure being attachable to a front spar of the wing and including a sub-spar supporting a D-nose aerodynamic profile skin panel forwardly thereof and an upper and a lower leading edge skin panel rearwardly thereof, at least one of said skin panels comprising a lightening shield having a fiber reinforced plastics laminate including a series of laminae of fiber reinforcing materials held together by plastics matrix material, wherein a layer of electrically conductive material as interposed between an outer lamina and its next adjacent lamina, said lightening shield defining at least one countersunk hole therethrough, the at least one hole being partly defined by a countersink which exposes an edge region of the layer of electrically conductive material for contact with a fastener sized to pass therethrough.

6. An aircraft wing including a wing structural box, a trailing edge structure located rearwardly of the wing structural box and a fixed leading edge structure located forward of the wing structural box, said leading edge structure including a sub-spar supporting a D-nose aerodynamic profile skin panel forwardly thereof and an upper and a lower leading edge skin panel rearwardly thereof, at least one of said skin panels comprising a lightening shield having a fiber reinforced plastics laminate including a series of laminae of fiber reinforcing materials held together by plastics matrix material, wherein a layer of electrically conductive material as interposed between an outer lamina and its next adjacent lamina, said lightening shield defining at least one countersunk hole therethrough, the at least one hole being partly defined by a countersink which exposes an edge region of the layer of electrically conductive material for contact with a fastener sized to pass therethrough.

* * * * *